Inventor
Charles H. Kasch
By Wilson, Dowell,
McCanna & Rehm
Attys.

Patented June 19, 1934

1,963,705

UNITED STATES PATENT OFFICE 1,963,705

HIGH PRESSURE GEAR PUMP

Charles H. Kasch, Rockford, Ill., assignor to Geo. D. Roper Corporation, Rockford, Ill., a corporation of Illinois Application May 4, 1931, Serial No. 534,862

3 Claims. (Cl. 103—126)

This invention relates to gear pumps generally, but has special reference to improvements designed particularly with a view to operation at high pressures, namely, pressures of say from about five hundred pounds per square inch up to about fifteen hundred pounds per square inch, as required in hydraulic power applications, such as machine tools, presses, lifts, etc.

It is obvious that such high pressures present special problems in the matter of bearings to properly assume the loads, and in the matter of adequately packing the pump to minimize leakage. The principal object of my invention is to provide a simple and practical pump construction having staggered bearings so as to permit the use of larger bearings than the spacing of the gear centers would permit otherwise, and having the pump housing proper enclosed and sealed by an external cover to prevent leakage.

Other features of the pump worthy of special mention are:

(1) The provision of four interchangeable face plates, two inner and two outer, each serving as a mounting for one of the four anti-friction bearings used in the pump for the support of the driving and idler shafts. The plates are so conformed that by simply reversing a plate end for end it can be made to serve as an inner or outer face plate on either side of the housing.

(2) The provision in connection with the driving shaft of an outboard bearing in the external cover functioning both as a radial and thrust bearing when clamped in place in said cover and spaced by means of a spacing sleeve from the adjacent main bearing of said shaft in the adjacent face plate.

The invention will be better understood as reference is made hereinafter to the accompanying drawings, in which—

The same reference numerals are applied to corresponding parts throughout the views.

Figure 3:
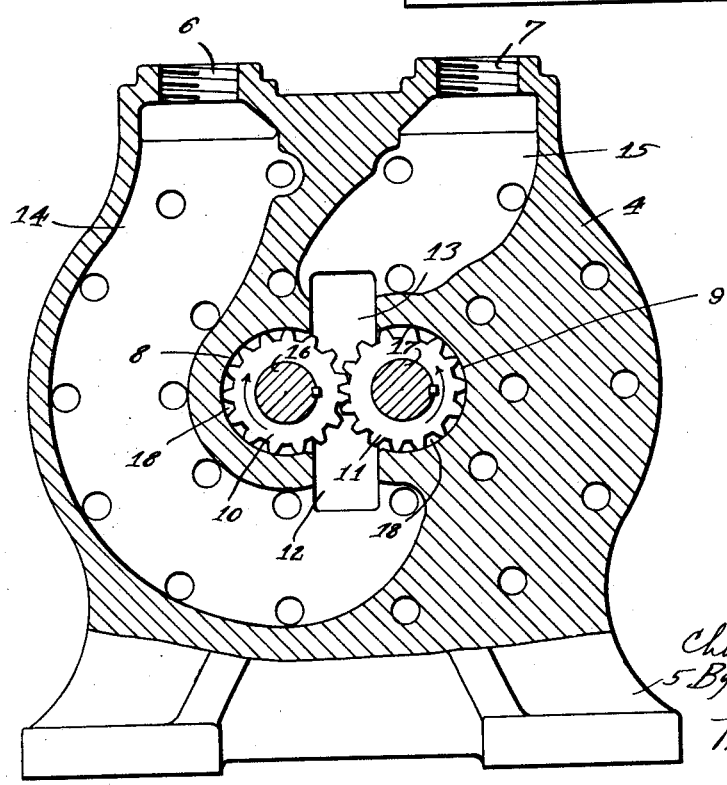
Fig. 3 is a transverse vertical section through the middle of the pump on the same scale as Fig. 2.

Referring first to Fig. 3, the pump housing is in the form of a casting designated generally by the reference numeral 4 having a base portion 5 suitably formed integral therewith to permit bolting of the pump onto a suitable support. The inlet connection with the housing 4 is made at 6, and the outlet connection at 7, both at the head end, as shown. Approximately centrally of the housing are cavities 8 and 9 in which intermeshing herringbone pumping gears 10 and 11 turn with a close working fit. The gears seal the suction chamber 12 from a discharge or pressure chamber 13. An intake passage 14 is cored in the housing extending downwardly from the intake 6 to a point below the pumping gears for communication with the suction chamber 12, and another passage 15 is cored in the housing extending upwardly from the discharge chamber 13 to the outlet 7. The gear 10 is keyed as shown onto the driving shaft 16, and the gear 11 is keyed on an idler shaft 17. From this much description it will be evident that when the gears turn in the direction indicated, the oil or whatever similar fluid medium is being used will be carried in the buckets 18 from the suction chamber 12 into the discharge chamber 13, and pressures of from five hundred pounds per square inch up to about fifteen hundred pounds per square inch are capable of being developed at the outlet 7 for hydraulic power applications of the kind mentioned above. No invention is claimed in the construction thus far described, excepting only in so far as certain of these features form a part of novel combinations hereinafter described.

The housing 4 has the cavities 8 and 9 opening from both sides thereof, and face plates 19 and 20, hereinafter to be referred to as the inner face plates, are arranged to be bolted onto the opposite sides of the housing to seal said cavities, leaving, however, operating clearance between said plates and the side faces of the gears 10 and 11 to permit normal operation of the latter. Two other face plates 21 and 22, hereinafter to be referred to as the outer face plates, have abutment with the outside of the inner face plates and are bolted therewith to the opposite sides of the housing. Thus, studs 23 project from the one side of the housing through registering bolt holes in the face plates 19 and 21, and studs 24 project from the other side of the housing through registering bolt holes in the face plates 20 and 22, and nuts are threaded on the projecting ends of said studs to force the face plates together tightly and against the opposite sides of the housing. Two holes $a$ and $b$ are provided in each of the face plates spaced to correspond with the spacing of the gear and shaft centers and large enough in diameter to permit the shafts 16 and 17 to pass therethrough freely with more than ordinary operating clearance, as shown. A large circular cavity c is formed in each face plate concentric with and as an enlargement of the hole a and opening from the opposite side of the plate. The face plates 19 and 21, it will be observed, are disposed in reversed relation to one another so that the hole a in plate 19 is in register with the hole b in plate 21, whereby to bring the cavities c of said plates in staggered or offset relation to one another. The same is true of the face plates 20 and 22. A pair of anti-friction bearings 25 are provided for the mounting of the driving shaft 16 on the outer face plates 21 and 22, and a pair of similar bearings 26 serve to mount the idler shaft 17 on the inner face plates 19 and 20. These bearings are snugly received in the cavities c and, of course, are disposed in staggered relation to one another, that being the relationship of the cavities. The bearings are all larger in diameter than the pumping gears so that the unit bearing pressure is reduced as far as practicable. Naturally, if it were not for the staggered relationship of the bearings they could not be any larger in diameter than the distance between gear centers. It is out of the question to construct an anti-friction bearing of so small a diameter that would stand the heavy loads assumed by the shafts in a high pressure gear pump such as we have under consideration here. The construction just described appears to be the most practical solution of the problem. The bearings 25 and 26 in the present case are actually ball bearings, but it will be evident that roller bearings could be used to equal advantage. The bearing 25 in the face plate 21 has its inner race confined in a special manner, as will hereinafter appear, in abutment with the annular shoulder 27 defined as a result of the reduction in diameter of the end portion 28 of the shaft 16 which projects from the pump for driving purposes. The other bearing 25 of the shaft 16 which is mounted in the face plate 22 has its inner race held against the annular shoulder 29 defined again by a reduction in diameter at the other end of the shaft, a lock nut 30 being threaded on the further reduced end of the shaft and locked in a conventional manner to hold the bearing in place. Each of the bearings 26 is held in place by a lock nut 31, with the inner race of the bearing in abutment with an annular shoulder 32 defined as a result of reduction in diameter of the ends of the shaft. Before passing to a description of other novel features of the invention, it should be observed that the inner face plates are disposed with their closed sides in abutment with the opposite sides of the housing to seal the cavities 8 and 9 and cooperate with the pumping gears to seal the discharge chamber 13 from the section chamber 12. The outer face plates, however, have their open sides toward the housing with a view to locating the bearings 25 as close as possible to the gear 10 and thus minimize deflection of the shaft 16 between the bearings. The four face plates 19—22 are constructed of identical form with the same spacing of holes a and b, the same sized cavity c, the same spacing of bolt holes, and the same length, width, and thickness, whereby to be interchangeable with one another. That is to say, an inner face plate will serve as an outer face plate, or vice versa; it is simply a matter of how the plates are disposed with respect to one another. This interchangeability of face plates is, of course, very advantageous from the standpoints of standardized production, less parts to list and keep in stock, and ease in replacement, as well as ease in assembling.

The inner and outer face plates are assembled on the housing without gaskets interposed either between the inner face plates and the housing or between the outer and inner face plates. The abutting faces are simply machined smooth so as to minimize leakage of fluid at the joints. The pump, as will now be described, is sealed externally. The advantages that go with the elimination of internal gaskets are: first, that there are so many places in the internal construction that would require sealing that numerous gaskets would be required to effect a good seal, whereas a single external gasket can be made to serve the same purpose, and, second, the areas available on the inside parts for gasket purposes are small by reason of the number of bolt holes, and so forth, all tending to increase the likelihood of leakage if gaskets were provided in the internal construction, whereas external gaskets can be provided without such limitation in the matter of areas and without the objection as to sealing about numerous bolt holes, etc. In accordance with my invention, two external cup-shaped covers 33 and 34 are provided to fit over the face plate assemblies on opposite sides of the housing, and the housing is provided of radially enlarged form so as to project sufficiently beyond the peripheries of the face plates for abutment of the flanged portions 35 and 36 of the two covers with the opposite sides thereof. Gaskets 37 are interposed at these joints to effect a seal for each face plate chamber. Studs 38 project from opposite sides of the housing through bolt holes in the flanged portions 35 and 36 of the covers, and have nuts threading on the projecting ends thereof, as shown, and arranged to be tightened to hold the covers in place and insure good seals at the gasketed joints. Obviously, the cover 34 provides a practically perfect seal for the assembly consisting of the face plates 20 and 22, there being only one joint and that being easily and effectively gasketed to prevent leakage. The cover 33, however, while gasketed in a similar manner for sealing of its joint with the housing, has to be provided with a hollow boss 39 for the projection therethrough of the reduced end 28 of the driving shaft 16. This feature therefore presents other problems in the matter of providing additional bearing support for the shaft, lubrication of such bearing, and effecting a good seal to prevent leakage from the face plate chamber along the shaft. The special construction provided to meet the needs of the situation will now be described.

Figure 1:
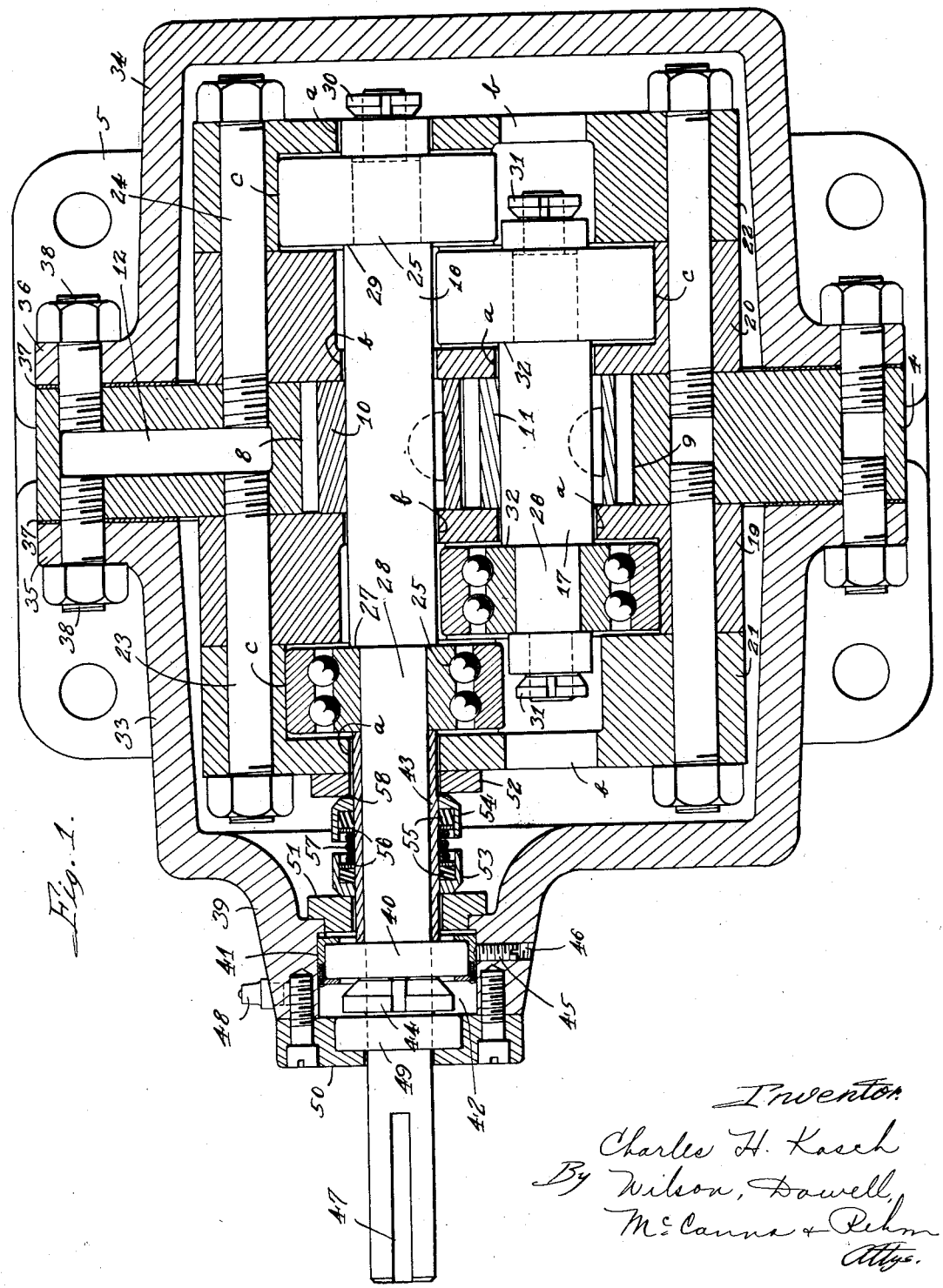
Figure 1 is a central horizontal section through a pump made in accordance with the invention.

An outboard bearing 40 of any suitable antifriction type, preferably of similar construction to the bearings 25 and 26, is mounted in a cage 41 arranged to be slidably received in a bearing chamber 42 formed in the boss 39. A spacing sleeve 43 is slipped over the reduced end 28 of the shaft 16 and passes freely through the hole a in the face plate 21 to have abutment with the inner race of the bearing 25 in said face plate. The bearing 40 with its cage 41 is slipped over the reduced end 28 of the shaft and into the bearing chamber 42 far enough to bring its inner race into engagement with the end of the sleeve 43. Then a nut 44 is threaded on the reduced end 28 of the shaft 16 inside the chamber 42, and is tightened to force the inner race member of the outboard bearing 40 against the end of the sleeve 43 and thereby force the inner race member of the bearing 25 against the annular shoulder 27, thus making the sleeve 43 rigid with the shaft so that it will turn therewith. Once the nut 44 has been tightened and locked, a set screw 45, which threads in a radial hole 46 in the boss 39, is tightened against the cage 41 to hold the same in place in the bearing chamber 42 and lock the outer race member of the bearing against turning. The outboard bearing manifestly assumes the lateral thrust on the shaft incident to the chain drive thereof, the sprocket for the chain being mounted on the projecting end of the shaft in the keyway indicated at 47 in Figure 1. It is obvious that without such an outboard bearing, the deflection of the shaft due to the spacing of the sprocket with respect to the adjacent main bearing 25 would be such as to result in abnormal vibration and noise in operation and premature wearing out of the bearings. A pressure lubrication fitting 48 is shown on the boss 39 communicating with the bearing chamber 42 to furnish lubricant to the outboard bearing, and a grease retainer 49 of any suitable construction fits about the shaft in the center hole of a cap 50 provided for the bearing chamber.

The bearing chamber 42 is sealed from the face plate chamber in cover 33 by sealing means cooperating with the spacing sleeve 43, as will now be described. A seat ring 51 encircles the one end of the sleeve 43 and has a reduced portion having a press fit in the inner end of the bearing chamber 42 whereby to accurately locate said ring with respect to the sleeve and insure the same ample clearance at all points between the sleeve and ring. Another seat ring 52 encircles the sleeve 43 near its other end with the same ample clearance, and has abutment with the outside of the face plate 21. The seat rings 51 and 52 are, of course, arranged to remain stationary. Sealing rings 53 and 54 are arranged to turn with the spacing sleeve 43 and be pressed into abutment with the rings 51 and 52, respectively. A washer 55 of rubber or similar material is pressed into a bore in each of the rings 53 and 54 to grip the sleeve 43 to insure turning of the rings with the sleeve in the turning of the shaft 16. Metal washers 56 engage the rubber washers in the two rings and have the opposite ends of a coiled compression spring 57 engaging the same so as to compress the rubber washers and urge the rings apart for snug engagement of the ring 53 with the seat ring 51, and similar snug engagement of the ring 54 with seat ring 52. The spring 57 fits about the sleeve 43, as indicated. One or more radial grooves 58 are suitably provided in the face of the sealing ring 54 for good lubrication of the bearing surfaces. Such grooves can be provided there since that is not the point where the actual seal for the face plate chamber is effected; the actual seal is taken care of by the cooperation of sealing ring 53 with seat ring 51. It will be evident that the construction just described is of simple and economical form and permits of easy assembling. In assembling, the sealing rings 53 and 54, together with their spring 57, are simply slipped over the spacing sleeve 43 prior to the assembling of the cover 33 on the housing. When the cover is bolted in place, the spring 57 is naturally compressed between the sealing rings as the seat ring 51 approaches the seat ring 52. And, of course, following the assembling of the cover, the outboard bearing 40 is assembled in place and the spacing sleeve 43 is made rigid with the shaft 16 in the manner above described.

Figure 2:
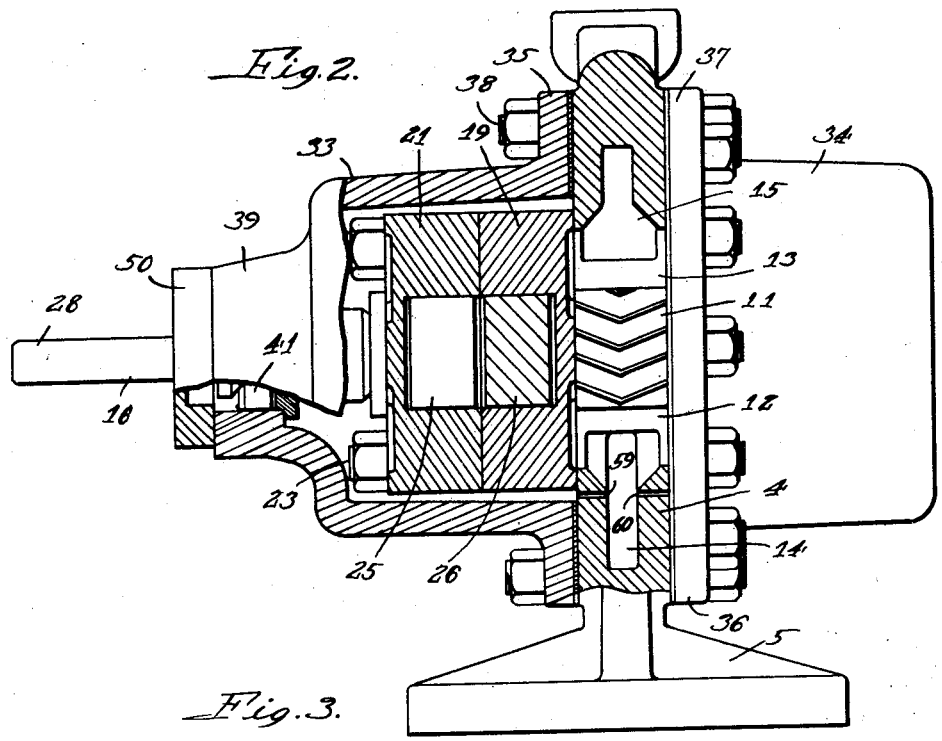
Fig. 2 is a view partly in side elevation and partly in vertical section of the same pump on a slightly smaller scale.

In operation, the oil or other fluid leaking from the pump housing through the face plates is trapped in the face plate chamber inside the cover 33 on one side of the housing, and in the face plate chamber in the cover 34 on the other side of the housing. The gaskets 37 prevent leakage of this fluid from the unit. Naturally, the sealing ring 53, by cooperation with the seat ring 51, is relied upon to prevent the fluid from leaking from the cover 33 along the shaft 16, or more specifically, along the sleeve 43 on the shaft 16. It is obvious that considerable pressure is apt to be developed in the face plate chambers in the covers 33 and 34. So far as the cover 34 is concerned, it is manifest that the gasket 37 can be relied upon to prevent leakage. However, as regards the cover 33, it must be evident that excessive pressure might result in objectionable leakage past the sealing ring 53. For that reason, I prefer to provide a small aperture 59, as shown in Fig. 2, establishing communication between the suction chamber 12 and the face plate chamber in the cover 33, whereby to relieve the pressure in the face plate chamber enough at least to keep well within the range of effectiveness of the sealing ring 53. A similar orifice 60 may be provided to establish communication between the suction chamber 12 and the face plate chamber in cover 34, as indicated in Fig. 2.

It is believed the foregoing description conveys a good understanding of all of the objects and advantages of my invention. The construction illustrated and described is obviously susceptible of various changes. The appended claims have, therefore, been drawn to cover all legitimate modifications and adaptations.

I claim:

1. In a gear pump comprising a housing having pumping gear cavities provided therein between a suction chamber and discharge chamber, and a pair of pumping gears disposed in said cavities separating said chambers, a face plate fastened on the side of the housing, shafts for supporting the gears on the housing, one of said shafts projecting through said face plate for drive purposes, said face plate having a cavity therein, an anti-friction bearing received in said cavity for supporting the shaft on the face plate, the outer race member of said bearing fitting closely in the cavity for stationary support thereof on the face plate, the inner race member of said bearing having abutment on the inner side thereof with an annular shoulder on the shaft, a cover enclosing the face plate and fastened to the housing, the shaft projecting through an opening in said cover, an anti-friction bearing received in said opening outwardly spaced with respect to the aforesaid bearing to serve as an outboard bearing for the shaft, the projecting end of the shaft being arranged to have means for driving the same connected therewith, the outer race member of said outboard bearing being stationary with the cover, a spacing sleeve on the shaft between the two bearings having abutment at its inner end with the inner race member of the first bearing and at its outer end with the inner race member of the outboard bearing, and a nut threading on said shaft outside the outboard bearing against the inner race member thereof.

2. A pump as set forth in claim 1, wherein the outboard bearing is slidably received in the opening in the cover for axial adjustment relative to the shaft into abutment with the end of the spacing sleeve, the pump including means engaging the bearing to hold the same in an adjusted predetermined position in said opening.

3. In a gear pump comprising a housing having pumping gear cavities provided therein between a suction chamber and discharge chamber, and a pair of pumping gears disposed in said cavities separating said chambers, two face plates in abutting relation fastened on each side of the housing, shafts for supporting the gears arranged to be supported on the face plates, the face plates having enlarged cavities provided therein to receive enlarged bearings reaching substantially the complete distance radially from one shaft to the other, the bearing cavities and bearings therein being in staggered relation to one another in the inner and outer face plates, the inner and outer face plates being of identical construction so that each inner face plate is interchangeable with its companion outer face plate or with the opposed inner and outer face plates, covers on opposite sides of the housing enclosing the face plates and sealing against leakage at the housing, one of the two shafts projecting through an opening provided in one of said covers, and shaft bearing and sealing means in said opening.

CHARLES H. KASCH.